(12) United States Patent
Horling et al.

(10) Patent No.: US 10,185,840 B2
(45) Date of Patent: Jan. 22, 2019

(54) CONDITIONAL DISCLOSURE OF INDIVIDUAL-CONTROLLED CONTENT IN GROUP CONTEXTS

(71) Applicant: Google Inc., Mountain View, CA (US)

(72) Inventors: Bryan Horling, Belmont, MA (US); Wan Fen Nicole Quah, Cambridge, MA (US); Maryam Garrett, Cambridge, MA (US); Ruijie He, Roxbury Crossing, MA (US)

(73) Assignee: GOOGLE LLC, Mountain View, CA (US)

( * ) Notice: Subject to any disclaimer, the term of this patent is extended or adjusted under 35 U.S.C. 154(b) by 131 days.

(21) Appl. No.: 15/252,019

(22) Filed: Aug. 30, 2016

(65) Prior Publication Data

US 2018/0060599 A1 Mar. 1, 2018

(51) Int. Cl.
| | | |
|---|---|---|
| *H04L 29/06* | (2006.01) | |
| *G06F 21/62* | (2013.01) | |
| *G06F 21/31* | (2013.01) | |
| *G06F 17/30* | (2006.01) | |

(52) U.S. Cl.
CPC .... *G06F 21/6218* (2013.01); *G06F 17/30867* (2013.01); *G06F 21/31* (2013.01); *H04L 63/105* (2013.01)

(58) Field of Classification Search
CPC .......................... H04L 63/105; G06F 17/30867
See application file for complete search history.

(56) References Cited

U.S. PATENT DOCUMENTS

| | | | |
|---|---|---|---|
| 2007/0150827 A1 | 6/2007 | Singh et al. | |
| 2011/0084807 A1* | 4/2011 | Logan | H04Q 9/00 340/10.1 |
| 2013/0166726 A1* | 6/2013 | Boldyrev | G06Q 50/01 709/224 |
| 2014/0195621 A1 | 7/2014 | Rao Dv | |
| 2015/0156171 A1* | 6/2015 | Biswas | H04L 63/04 726/26 |
| 2015/0185996 A1 | 7/2015 | Brown et al. | |
| 2015/0319141 A1* | 11/2015 | Jang | H04W 4/21 726/26 |

(Continued)

OTHER PUBLICATIONS

International Search Report and Written Opinion of PCT Ser. No. PCT/US2017/048557; 15 pages dated Nov. 8, 2017.

(Continued)

*Primary Examiner* — Ellen Tran
(74) *Attorney, Agent, or Firm* — Middleton Reutlinger

(57) ABSTRACT

Methods, apparatus, systems, and computer-readable media are provided for interactive assistant modules to safely access and provide restricted content in group contexts. In various implementations, a dialog between a first individual and an interactive assistant module may be determined to be sensorially perceivable by at least a second individual. Restricted content that is to be automatically incorporated into the dialog by the interactive assistant module may be identified. In various implementations, access to the restricted content may be controlled by the first individual. In various implementations, the restricted content may be conditionally incorporated into the dialog in response to a determination that the second individual is authorized to perceive the restricted content.

19 Claims, 8 Drawing Sheets

(56) References Cited

U.S. PATENT DOCUMENTS

2017/0040002 A1* 2/2017 Basson .................. G09G 5/37

OTHER PUBLICATIONS

European Patent Office; Written Opinion of the International Preliminary Examining Authority of PCT Ser. No. PCT/US2017/046557; 7 pages; dated Jul. 13, 2018.
European Patent Office; International Preliminary Report on Patentability of PCT Ser. No. PCT/US2017/046557; 16 pages; dated Nov. 12, 2018.

* cited by examiner

CONDITIONAL DISCLOSURE OF INDIVIDUAL-CONTROLLED CONTENT IN GROUP CONTEXTS

BACKGROUND

Interactive assistant modules (also known as "personal assistant modules" or "mobile assistants") may be operated on a variety of computing devices, such as smart phones, tablet computers, wearable devices, automobile computing systems (e.g., navigation systems, vehicle media systems, etc.), standalone voice-activated products, and so forth. Interactive assistant modules may provide output using modalities that may be sensorially perceivable by multiple individuals. For example, a standalone personal assistant device may provide audible output that may be heard by multiple nearby individuals. In a group chat context (e.g., group multimedia messaging service, or "MMS," messages), any participant in the message exchange thread may see content incorporated into the message exchange thread by the interactive assistant module. In some instances, interactive assistant modules may have access to sensitive and/or restricted content associated with and/or under the control of one or more individuals.

SUMMARY

The present disclosure is generally directed to methods, apparatus, and computer-readable media (transitory and non-transitory) for interactive assistant modules to safely access and disclose restricted content in group contexts. In various implementations, restricted content may include a variety of information controlled by one or more individuals that may or may not be confidential or otherwise sensitive, such as user nicknames, personal preferences (e.g., individual A doesn't like seafood), photos, videos, audio recordings, phone numbers, contact information, trip information (e.g., itinerary), email/text contents, current location, calendar appointments, tasks lists, authentication credentials (e.g., usernames, passwords), and so forth. For example, an individual may prefer that his or her interactive assistant module refer to them with the nickname "your majesty" when alone, but may prefer that the interactive assistant module use their name when in the presence of others.

In various implementations, such restricted content may be conditionally disclosed—e.g., incorporated into a message exchange thread or spoken by a voice-activated interactive assistant module—based on individuals that may potentially perceive it and/or permissions associated with the restricted content. In some implementations when access to the restricted content is to be denied, unrestricted content may be output instead, e.g., as a substitute for the restricted content.

In various implementations, it may be determined that an output modality employed by an interactive assistant module, such as a spoken or written dialog between the interactive assistant module and one or more individuals, may be sensorially perceivable by one or more other individuals. It may also be determined that the interactive assistant module is to disclose restricted content (by explicit request or automatically in response to an utterance or statement) that is controlled by a particular individual. Before the interactive assistant module discloses the restricted content using its normal output modality, it may determine whether it is permitted to do so. For example, in some implementations, the interactive assistant module may determine whether the content is of a type (or "class") to which the particular individual has granted various levels of access. Based on these determinations, the interactive assistant module may conditionally disclose the restricted content. In some implementations, if the interactive assistant module has not yet been authorized to disclose the restricted content, the interactive assistant module may prompt the individual that controls the restricted content, e.g., using a different output modality (e.g., text message, popup window on the owner's phone, etc.) for authorization to disclose the restricted content.

An interactive assistant module may determine that the modality it uses is likely "sensorially perceivable" by others—that is, others can detect output provided via the modality using one or more senses, such as sight, touch, hearing, smell, etc.—in various ways. In some implementations, the interactive assistant module may use a watch/phone-equipped position coordinate sensor (e.g., global positioning system, or "GPS", wireless triangulation, etc.) to determine that the particular individual is in a public place such as a restaurant or bar at which others are also likely present. In other implementations, the interactive assistant module may use signals such as an individual's calendar to determine whether other individuals are likely present (e.g., is the individual scheduled to be in a meeting?). In the automobile context, an interactive assistant module operating on a vehicle computer system may use signals from seat sensors and/or seat belts to determine that the individual is not alone in a vehicle. In some implementations, particularly with standalone voice-activated products, the interactive assistant module may detect, over time, patterns of when one or more individuals are likely to be co-present. For example, the personal assistant device may determine that during the hours of 6-10 pm on weeknights, an individual's spouse and/or other family members tend to be co-present. In the group chat context (e.g., MMS threads), the interactive assistant module may simply examine the participants of the group chat.

In some implementations, the interactive assistant module may identify particular individuals that are co-present or that otherwise would perceive its output, so that it can make more granular decisions as to whether to disclose restricted content. For example, an interactive assistant module operating on a standalone personal assistant device or smart phone could use speaker recognition and/or signals from mobile devices or identification devices (e.g., radio frequency identification, or "RFID," badges) carried by nearby individuals to more granularly identify who is present, rather than simply determine that someone is present. In various implementations, the interactive assistant module may assign group ID numbers to various combinations of individuals who are detected to be co-present (or participants in a message exchange thread), so that the interactive assistant module can "remember" various restricted content that is or is not permissible to share in such a group context.

In some implementations, a computer implemented method may be provided that includes the following operations: determining, by one or more processors, that a dialog between a first individual and an interactive assistant module is sensorially perceivable by at least a second individual; identifying, by one or more of the processors, restricted content to be automatically incorporated into the dialog by the interactive assistant module, wherein access to the restricted content is controlled by the first individual; and conditionally incorporating, by one or more of the processors, into the dialog, the restricted content in response to a determination that the second individual is authorized to perceive the restricted content.

This method and other implementations of technology disclosed herein may each optionally include one or more of the following features.

In various implementations, the method may further include providing, by one or more of the processors, output to the first individual soliciting authorization from the first individual to incorporate the restricted content into the dialog. The output soliciting authorization may be provided in response to a determination that the second individual is not authorized to perceive the restricted content. The determination that the second individual is authorized may include receiving authorization from the first individual to incorporate the restricted content into the dialog. In some implementations, the dialog between the first individual may occur over a first output modality, and the output soliciting approval may be provided to the first individual via a second output modality that is not sensorially perceivable by the second individual.

In some implementations, determining that the dialog is sensorially perceivable to at least the second individual may include determining that the second individual is a participant in the dialog with the first individual. In some implementations, determining that the dialog is sensorially perceivable to at least the second individual may include determining, based on one or more signals, that the second individual is co-present with the first individual. In some implementations, the one or more signals may include a calendar entry that indicates co-presence of the first and second individuals. In some implementations, the one or more signals may include an audio signal produced by an audio sensor. In some implementations, the one or more signals may include correspondence between a position coordinate of the first individual and a location known to be likely inhabited by multiple individuals. In some implementations, the one or more signals may include one or more car seat sensors signals. In some implementations, the one or more signals may include a history of co-presence of the first individual with others.

In some implementations, the method may further include conditionally incorporating, by one or more of the processors, an unrestricted content into the dialog as a substitute for the restricted content in response to a determination that the second individual is not authorized to perceive the restricted content. In some implementations, the restricted content may include information that is confidential to the first individual. In some implementations, the restricted content may include a nickname of the first individual. In some implementations, the restricted content may include content deemed potentially offensive to the second individual.

In some implementations, the determination that the second individual is authorized to perceive the restricted content may include a determination that the second individual is authorized to perceive a class of restricted content with which the restricted content is associated. In some implementations, the determination that the second individual is authorized to perceive the restricted content may include a determination that the second individual was previously authorized to perceive the restricted content.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
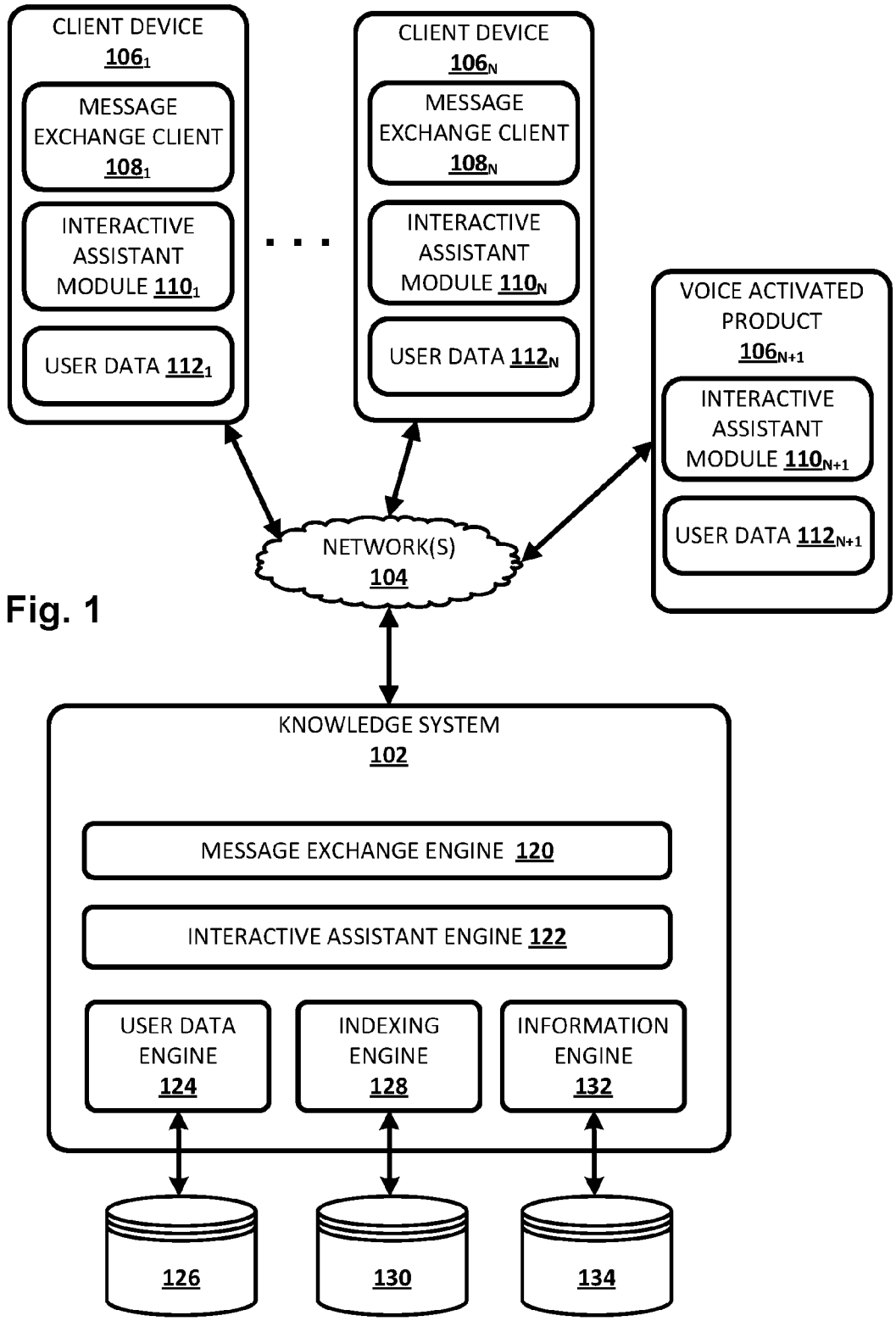
FIG. 1 illustrates an environment in which one or more techniques described herein may be practiced, in accordance with various implementations.

FIG. 1 illustrates an environment in which interactive assistant modules may safely access and disclose restricted content in group contexts. The example environment includes a plurality of client devices $106_{1-N}$ that are being operated by their respective users (not depicted) to participate in a so-called "message exchange thread," one or more standalone voice-activated products (e.g., smart speakers) $106_{N+1}$, and a knowledge system 102. Knowledge system 102 may be implemented in one or more computers that communicate, for example, through a network. Knowledge system 102 is an example of an information retrieval system in which the systems, components, and techniques described herein may be implemented and/or with which systems, components, and techniques described herein may interface.

A user may interact with knowledge system 102 via one or more client devices 106. Each client device 106 may be a computer coupled to the knowledge system 102 through one or more networks 104 such as a local area network (LAN) or wide area network (WAN) such as the Internet. Each of client devices $106_{1-N}$ may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices, such as the aforementioned standalone voice activated product $106_{N+1}$, may be configured with selected aspects of the present disclosure. In many instances, an individual may operate/own a plurality of client devices 106 that collectively form a coordinated "ecosystem" of client devices associated with that individual.

Each client device 106 may operate a variety of different applications, such as a message exchange client 108 and an interactive assistant module 110. Additionally, in some implementations, each client device 106 may have access to one or more sources of user data 112. User data 112 may include a variety of information controlled by one or more individuals that may be accessible to one or more interactive assistant modules 110. In some implementations, user data 112 may include restricted content that is associated with a particular individual, and which may not be readily accessible to other individuals without authorization by the controlling individual. Non-limiting examples of restricted content were set forth above. User data 112 may be stored locally on client devices 106 and/or remotely on one or more servers/databases, such as in index 126 described below.

In some implementations, each interactive assistant module 110 may have access to user data 112 controlled by, owned, or otherwise associated with a specific individual they serve. In other implementations, interactive assistant modules 110 may not serve a particular individual(s), and may instead serve any individual that interacts with interactive assistant module 110 via one or input modalities. In such case, interactive assistant modules 110 may have access to user data 112 associated with one or more users. As will be described in more detail below, interactive assistant modules 110 may conditionally disclose restricted content based on whether the disclosure would be sensorially perceivable by one or more individuals without authorization.

Message exchange client 108 may facilitate participation in a message exchange thread with one or more other individuals. Message exchange client 108 may come in various forms. In some implementations, message exchange client 108 may come in the form of a short messaging service ("SMS") and/or MMS client, an online chat client (e.g., instant messenger, Internet relay chat, or "IRC," etc.), a messaging application associated with a social network, an interface for conversing with an interactive assistant module operating on a client device, and so forth. In some implementations, message exchange client 108 may be implemented within a webpage rendered by a web browser (not depicted). In various instances, two client devices 106 operated by participants of a message exchange thread may run different message exchange clients 108 that nonetheless facilitate communication using a common communication protocol. For example, client device $106_1$ may have one SMS application distributed by one vendor installed, and client device $106_N$ may have another SMS application distributed by another vendor installed.

As described in the background, in various implementations, interactive assistant module 110 may take the form of a software process that executes on a given client computing device 106 to provide user-friendly interfaces for users to issue natural language commands and requests. Interactive assistant module 110 may be invoked or "awakened" by various stimuli, such as a user speaking or otherwise inputting one or more code words that are selected to activate interactive assistant module 110. In addition, in some implementations, interactive assistant module 110 may be equipped with (or have access to) one or more grammars, parsers, dialog managers, semantic processors, syntactic processors, and/or other components (not depicted) that enable interactive assistant module 110 to parse and interpret the semantic meaning of input (spoken or otherwise) received from an individual and respond in kind. Once interactive assistant module 110 has parsed and interpreted the meaning of an individual's statement or utterance, interactive assistant module 110 may perform various responsive operations, including but not limited to performing searches for information from remote and/or local sources (e.g., user data 112), engaging in a dialog with the individual, initiating one or more applications, preparing and/or sending emails or text messages, operating various input and output components (e.g., cameras, motion sensors, GPS, etc.), provide directions, and so forth.

In some implementations described herein, an individual may communicate with interactive assistant module 110 in a message exchange thread, e.g., using voice input, text input, and so forth. Further, interactive assistant module 110 may participate in a message exchange thread that involves multiple message exchange clients 108 operating on multiple client devices 106 (e.g., $106_{1-N}$ in FIG. 1) and controlled by multiple participants. For example, and as will be described in more detail below, interactive assistant module 110 may automatically select and incorporate content into a message exchange thread in response to one or more messages contributed to the message exchange thread by one or more participants.

In some implementations, one or more individuals may exchange spoken dialog with an interactive assistant module 110 that may or may not necessarily be part of an ongoing textual message exchange thread. For example, various individuals may engage in an interactive voice-based dialog with interactive assistant module $110_{N+1}$ executing on voice-activated product $106_{N+1}$. One common use of voice-activated products (particularly when marketed as smart speakers) is to play music or various multimedia files. However, in various implementations, interactive assistant module $110_{N+1}$ that executes on voice-activated product $106_{N+1}$ may provide much of the same functionality as is provided by interactive assistant modules $110_{1-N}$ executing on other types of client devices $106_{1-N}$. For example, interactive assistant module $110_{N+1}$ operating on voice-activated product $106_{N+1}$ may have access to the same user data $112_{N+1}$ that is accessible to other interactive assistant modules 110 operating on other client devices. Accordingly, interactive assistant module $110_{N+1}$ may perform various tasks similar to tasks performed by interactive assistant modules $110_{1-N}$, such as taking dictation, providing directions, performing searches of remote and local data sources (e.g., user data $112_{N+1}$), initiating applications, drafting and sending messages, operating input and output devices such as cameras and printers, and so forth.

It should be understood that examples described herein as being applicable to standalone voice-activated product $106_{N+1}$ may be equally applicable to other types of client devices 106. One or more individuals may just as easily interact with an interactive assistant module 110 operating on a smart phone, smart watch, tablet computer, etc., using his or her voice. For example, an individual may place his or her smart phone on a table so that the individual and any other individuals that are co-present may engage in spoken dialog with the smart phone. In such instances, other co-present individuals may be able to hear the interaction, and hence the smart phone may operate similarly to a standalone voice-activated product.

Each client device 106 and knowledge system 102 may include one or more memories for storage of data and software applications, one or more processors for accessing data and executing applications, and other components that facilitate communication over a network. The operations performed by one or more client devices 106 and/or knowledge system 102 may be distributed across multiple computer systems. Knowledge system 102 may be implemented as, for example, computer programs running on one or more computers in one or more locations that are coupled to each other through a network.

In various implementations, knowledge system 102 may include a message exchange engine 120, an interactive assistant engine 122, a user data engine 124, an indexing engine 128, and/or an information engine 132. In some implementations one or more of engines 120, 122, 124, 128, and/or 132 may be omitted. In some implementations all or aspects of one or more of engines 120, 122, 124, 128, and/or 132 may be combined. In some implementations, one or more of engines 120, 122, 124, 128, and/or 132 may be implemented in a component that is separate from knowledge system 102. In some implementations, one or more of engines 120, 122, 124, 128, and/or 132, or any operative portion thereof, may be implemented in a component that is executed by one or more client devices 106.

In various implementations, message exchange engine 120 may be configured to facilitate a message exchange thread between multiple message exchange clients 108 operating on multiple client devices $106_{1-N}$ controlled by multiple participants. For example, message exchange engine 120 may maintain a global "transcript" of messages and other content participants exchange with each other in a message exchange thread. As used herein, a "transcript" may refer to a live record of text, images, sounds, and/or applets exchanged and/or viewed by one or more participants in a message exchange thread. In some implementations, a transcript of a message exchange thread may be updated in real time or near real time as the participants converse.

Interactive assistant engine 122 may be configured to enhance, compliment, and/or supplement functionality provided by one or more interactive assistant modules 110 operating on one or more client devices 106. For example, client devices 106 may be relatively resource-constrained. Local interactive assistant modules 110 may include or otherwise have access to various offline components for parsing and interpreting user input (spoken or otherwise), such as parsers, syntactic processors, grammars, semantic processors, and so forth. However, given the limited computing resources (e.g., memory, processor power, etc.) of client devices 106, these offline components for parsing and interpreting user input may be relatively limited.

Accordingly, one or more interactive assistant modules 110 may interact with or otherwise operate in conjunction with one or more online interactive assistant engines 122. Interactive assistant engine 122 may have access to a variety of online resources and components (not depicted), including but not limited to semantic processors, grammars, parsers, syntactic processors, and so forth. These online resources and components may be far more robust than the offline counterparts available on client devices 106. Moreover, interactive assistant engine 122 may be able to leverage the virtually limitless computing resources of multiple online servers (e.g., a so-called "cloud") to perform more accurate parsing and interpretation of user-provided input, spoken or otherwise. In various implementations, interactive assistant modules 110 operating on client devices 106 may utilize any combination of offline and online resources (including resources available to interactive assistant engine 122) to parse and/or interpret user input, e.g., depending on factors such as whether the client devices 106 are currently online, a strength of a network connection available to a wireless client device 106, a complexity of the user input received, and so forth. When a particular action is described herein as being performed by an interactive assistant module 110 or interactive assistant engine 122, it should be understood that such action may be performed by either component, alone or in combination with the other component.

User data engine 124 may have access to various user data 112 that is stored online in index 126. Emails, text messages, calendar entries, nicknames, itineraries, online profiles, online contact lists, social network profiles, task lists, and a variety of other user data 112 may be stored in whole or in part on one or more computing systems that are remote from client device 106, in addition to or instead of locally on client device 106. In this sense, index 126 merely represents one or more databases or other storage mechanisms that may or may not be related to each other, and that may store various user data 112 that may or may not also be available locally on client devices 106. User data engine 124 may be configured to access these various sources of user data 112. When implementations are described herein as conditionally incorporating, outputting, or otherwise disclosing user data 112, it should be understood that the user data 112 may be obtained from local user data 112 stored on client devices 106, from remote user data stored in index 126 (which can include any number of disparate data sources), and/or from any combination of the two. In some implementations, if interactive assistant module 110 or interactive assistant engine 122 is unable to obtain user data 112 from client devices 106, the user data 112 may instead be obtained by requesting it from user data engine 124.

Indexing engine 128 may maintain an index 130 for use by knowledge system 102. The indexing engine 128 processes documents and updates index entries in the index 130, for example, using conventional and/or other indexing techniques. For example, the indexing engine 128 may crawl one or more resources such as the World Wide Web and index documents accessed via such crawling. As another example, the indexing engine 128 may receive information related to one or documents from one or more resources such as web masters controlling such documents and index the documents based on such information. A document is any data that is associated with a document address. Documents include web pages, word processing documents, portable document format (PDF) documents, images, emails, calendar entries, videos, and web feeds, to name just a few. Each document may include content such as, for example: text, images, videos, sounds, embedded information (e.g., meta information and/or hyperlinks); and/or embedded instructions (e.g., ECMAScript implementations such as JavaScript).

Information engine 132 may maintain another index 134 that includes or facilitates access to non-document-specific information for use by the knowledge system 102. For example, knowledge system 102 may be configured to return information in response to search queries that appear to seek specific information. If a user searches for "Ronald Reagan's birthday," knowledge system 102 may receive, e.g., from information engine 132, the date, "Feb. 6, 1911." This information may be returned to the user as a part of search results that is separate from documents received from indexing engine 128. In various implementations, index 134 itself may contain information, or it may link to one or more other sources of information, such as online encyclopedias, almanacs, and so forth. In various implementations, index 130 or index 134 may include mappings between queries (or query terms) and documents and/or information.

In this specification, the term "database" and "index" will be used broadly to refer to any collection of data. The data of the database and/or the index does not need to be structured in any particular way and it can be stored on storage devices in one or more geographic locations. Thus, for example, the indices 126, 130, and 134 may include multiple collections of data, each of which may be organized and accessed differently.

In various implementations, one or more message exchange clients 108, message exchange engine 120, interactive assistant modules 110, and/or interactive assistant engine 122 may be configured to detect one or more cues emanating from a message exchange thread involving two or more message exchange clients 108. In various implementations, the one or more cues may trigger incorporation, e.g., by way of interactive assistant module 110, of various information into the message exchange thread. This information may include, but is not limited to, one or more selectable applications links may link to an application that is distinct from the message exchange thread, information and/or documents retrieved by indexing engine 128 and/or information engine 132, information associated with (e.g., controlled by) individuals that is contained in user data 112, and so forth.

In some implementations, the cues may emanate from content of a message exchange thread between multiple message exchange clients 108. For example, one or more participants mentioning an entity or keyword/key phrase associated with one or more applications may constitute a cue to incorporate one or more selectable application links to the one or more applications into the message exchange thread. Another example of a cue is a statement directed by one or more participants to another that matches a pattern or template associated with an application. In yet other implementations, cues may be more explicit. For example, a user could input a message into the thread that is directed at her interactive assistant module, e.g., "Hey BOT, what's the weather in San Francisco?" This may prompt the interactive assistant module to incorporate information about the weather in San Francisco into the transcript of the message exchange thread, and/or a link to a weather app that is already preloaded with San Francisco weather.

In some implementations, knowledge system 102 may have, e.g., as part of information engine 132 and/or another component, a so-called knowledge base that contains records of known entities (e.g., people, places, things) and relationships between the known entities. In some implementations, such a knowledge base may be implemented, e.g., in index 134, as a graph in which nodes represent entities and edges represent relationships between entities, although this is not required. In some such implementations, information about entities from such a knowledge base may be made available to components such as message exchange engine 120, one or more message exchange clients 108, interactive assistant module 110, and/or interactive assistant engine 122. Those components may then use the entity information to identify information that is requested or pertinent to content of a message exchange thread or other dialog between one or more individuals and interactive assistant module 110.

As noted above, in various implementations, user data 112 associated with or otherwise controlled by an individual may or may not be restricted. For example, a first individual may have a contact list that includes contacts from one or more sources, such as a phone contact list, a social network, and so forth. By default, the first individual's contact information may be considered restricted in that authorization from the first individual must be obtained before a component such as interactive assistant module 110 operating on any client device 106 will disclose that information or otherwise make it available to other individuals in a group context.

Suppose the first individual or another individual requests the contact information from interactive assistant module 110. It may be determined, e.g., by interactive assistant module 110, that a dialog between the first individual and interactive assistant module 110 will sensorially perceivable by at least a second individual, and/or that an output modality used by interactive assistant module 110, such as computer-generated voice output, visual output (e.g., a message in a textual message exchange thread), and so forth, will be sensorially perceivable by a group of two or more individuals. Upon such a determination, interactive assistant module 110 may identify the content to be automatically incorporated into the dialog or otherwise output by the interactive assistant module as potentially restricted. Interactive assistant module 110 may then conditionally incorporate, into the dialog, the restricted content in response to a determination that one or more other individuals that may perceive the restricted content is authorized to do so.

Figure 2:
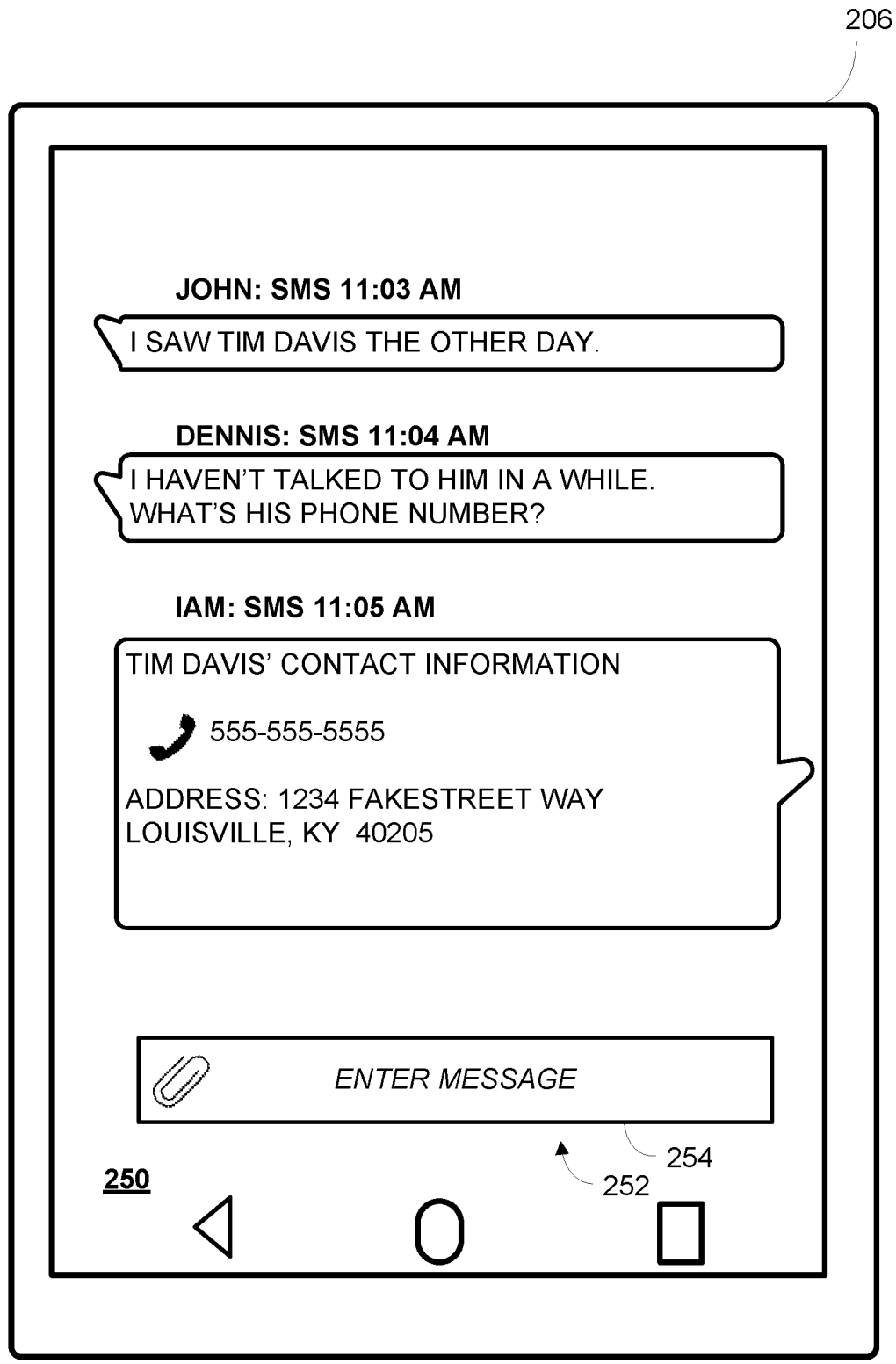
FIG. 2 and FIG. 3 depict examples of how client devices may render a graphical user interface for a message exchange client, in accordance with various implementations.

FIG. 2 depicts an example client device 206 operated by a user named Sven. Client device 206 includes a graphical user interface 250 associated with a message exchange client (not depicted specifically in FIG. 2) that operates on client device 206. Graphical user interface 250 displays a transcript 252 of a message exchange thread or textual dialog between Sven and two other users, John and Dennis. Graphical user interface 250 also includes a text input field 254 that Sven can use to input text or other content into the message exchange thread, e.g., in response to previous statements by the other two participants.

For this example, suppose Sven has in his contact list contact information for someone named "Tim Davis." John has stated that he saw Tim Davis recently. Dennis asked, "What's his [Tim Davis'] phone number?" An interactive assistant module 110 (which may or may not serve or otherwise be specifically associated with Sven) operating on client device 206 (or another client device operated by John or Dennis) may determine whether Sven has previously authorized disclosure of his contact list, and/or disclosure of Tim Davis' contact information specifically. In this example, interactive assistant module 110 determined that Sven has previously authorized disclosure of Tim Davis' contact information. Accordingly, interactive assistant module 110 ("IAM" in FIG. 2 and other figures) responded by automatically incorporating Tim Davis's contact information into the message exchange thread.

An individual may authorize disclosure of restricted content contained in user data 112 associated with (e.g., controlled by) that individual in various ways. In some implementations, an individual may, in his or her own time, operate or otherwise interact with one or more client devices 106 to preemptively authorize specific content items contained in user data 112. For example, Sven may preemptively authorize one or more interactive assistant modules 110 (e.g., that serve Sven or others) to disclose one or more contacts in Sven's contact list. An individual may authorize disclosure in various ways, such as using one or more graphical user interfaces, by instructing interactive assistant module 110 (e.g., using voice commands), and so forth.

In some implementations, separate output may be provided to an individual to solicit authorization from the individual to disclose restricted content controlled by that individual. The solicitation may be provided, for instance, in response to a determination that another individual that would perceive the restricted content if disclosed is not authorized to perceive the restricted content. In some implementations, the output soliciting approval may or may not be provided to the controlling individual using a different output modality that may not be sensorially perceivable by others.

Figure 3:
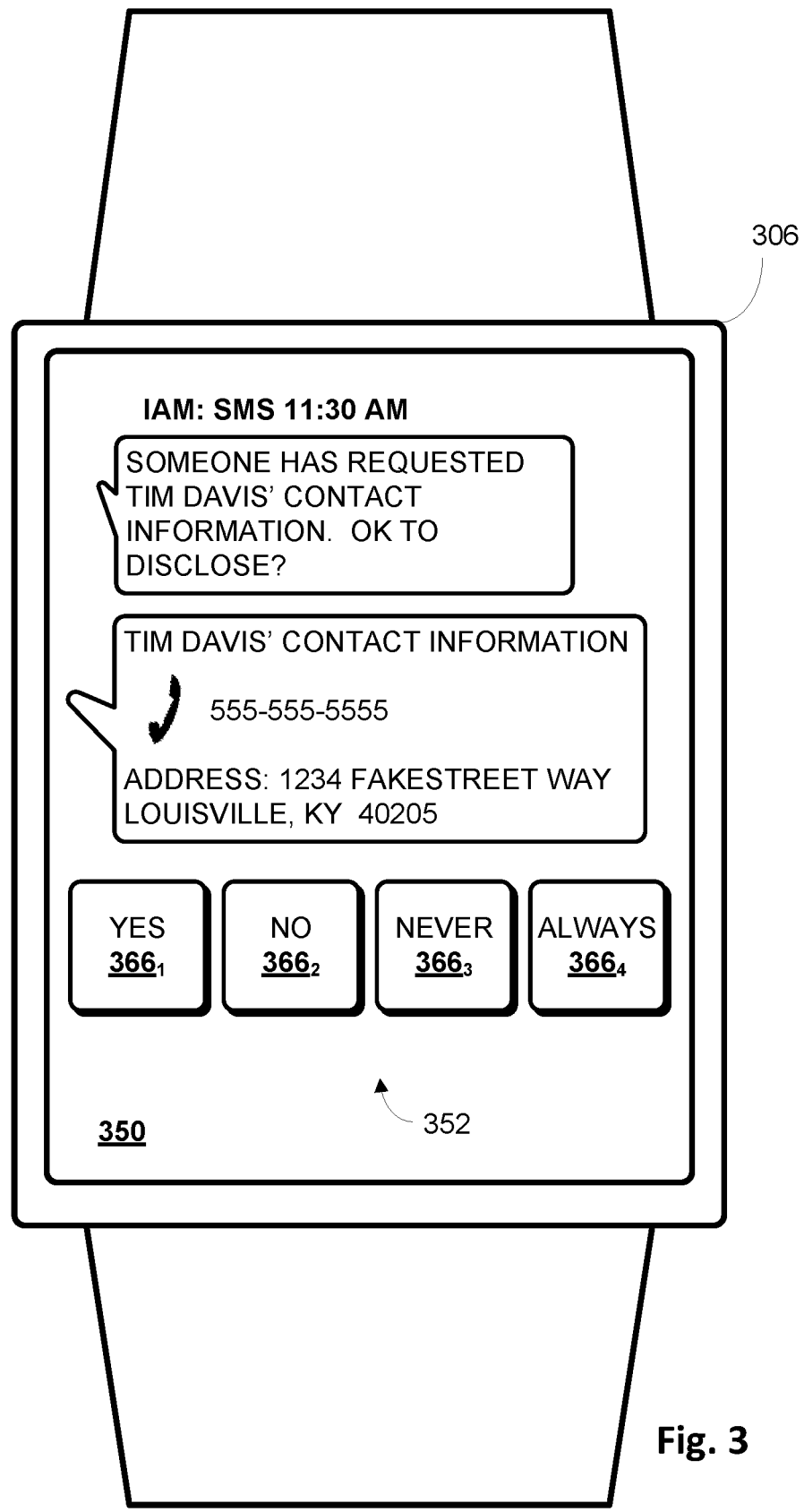

An example of this is depicted in FIG. 3. Another client device 306 in the form of a smart watch operated by Sven includes a graphical user interface 350 associated with a message exchange client (not depicted specifically in FIG. 3) that operates on client device 306. Graphical user interface 350 displays a separate transcript 352 or textual dialog between Sven and an interactive assistant module 110. Suppose Sven is participating in the main message exchange thread with John and Dennis on his smart phone (client device 206 in FIG. 2). In FIG. 3, Sven has received a separate message from interactive assistant module 110 seeking authorization to disclose Tim Davis' contact information. Sven can press a "Yes" button ($366_1$) or a "No" button ($366_2$) to authorize or not authorize, respectively, interactive assistant module 110 to disclose Tim Davis' contact info in message exchange thread 252 of FIG. 2. In some implementations, additional buttons $366_3$ and/or $366_4$ may be selectable by Sven to permanently restrict or authorize disclosure, e.g., so that Sven is not prompted for authorization later (i.e., Sven's responses become "durable" and will be applied moving forward). Because the solicitation depicted in FIG. 3 is sought using Sven's smart watch, which presumably isn't perceivable to John or Dennis, Sven is able to discreetly allow or deny access to Tim Davis' contact information. The same principle may apply to any restricted content controlled by Sven, such as his emails, calendar, nickname, task list, personal data, etc.

Figure 4:
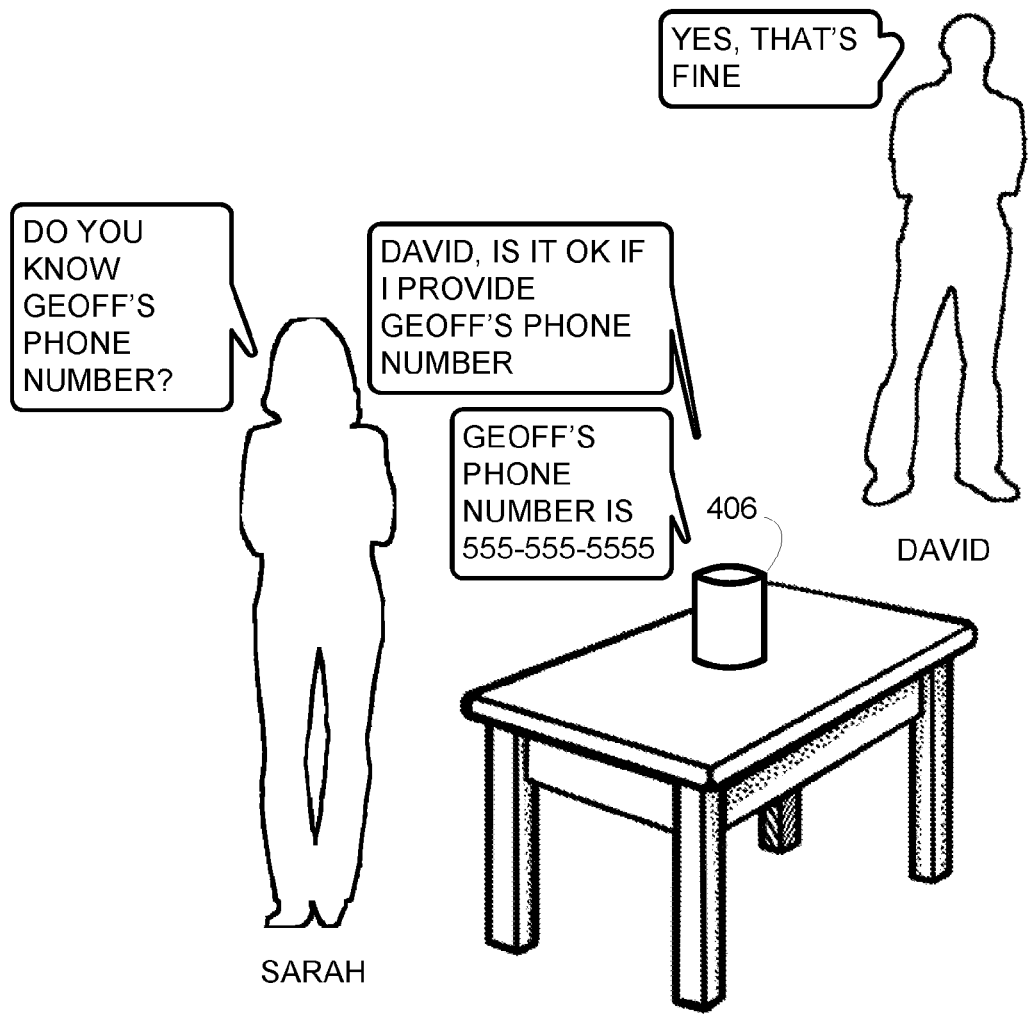
FIG. 4 depicts one example of disclosed techniques may be practiced in a scenario in which multiple users interact with an interactive assistant module, in accordance with various implementations.

In the example of FIG. 3, the output soliciting approval to disclose the restricted content is provided to Sven using a separate modality from that used for the message exchange thread between Sven, John, and Dennis. However, this is not meant to be limiting. In various implementations, such solicitation may be provided using the same output modality. In FIG. 4, for instance, two individuals, David and Sarah, are co-present with a client device 406 in the form of a standalone voice-activated product (similar to $106_{N+1}$). Sarah asks David, "Do you know Geoff's phone number?" Before David has a chance to respond (or perhaps after David indicates he doesn't remember the phone number), an interactive assistant module (not depicted in FIG. 4, see 110 in FIG. 1) operating on client device 406 asks, aloud, "David, is it OK if I provide Geoff's phone number?" David provides authorization by responding, "Yes, that's fine." Client device 406 then speaks Geoff's phone number aloud, for Sarah to hear.

In other implementations in which the interactive assistant module has specifically identified Sarah as being present and has her contact information (e.g., from David's contact list), the interactive assistant module may additionally or alternatively provide Sarah with Geoff's phone number using yet another modality, such as a text message to Sarah, so that Sarah doesn't have to write it down or remember it. And in an alternative implementation, client device 406 may separately (and in some cases, discreetly) send David a text message or other similar communication (e.g., such as was depicted in FIG. 3) seeking David's authorization to disclose Geoff's phone number.

Referring back to FIG. 1, interactive assistant module 110 and/or interactive assistant engine 122 may determine that a dialog between a first individual and interactive assistant module 110 is sensorially perceivable by at least one or more other individuals—or alternatively, may determine that an output modality used by interactive assistant module 110 is sensorially perceivable by a group of two or more individuals—in various ways. In the scenario in which multiple individuals are participating in a text message exchange thread using respective message exchange clients 108 operating on separate client devices, as is the case between client devices $106_{1-N}$, determining that multiple individuals will perceive content incorporated into the message exchange thread may be straight-forward. Interactive assistant module 110 and/or interactive assistant engine 122 may simply take stock of the senders and/or receivers of individual messages.

However, in the scenario in which multiple individuals are co-present with a standalone voice-activated product (similar to $106_{N+1}$), additional signals may be considered to determine that output provided by interactive assistant module 110 will be perceived by multiple individuals, some of which may or may not have previously been authorized to perceive restricted content. In some implementations, interactive assistant module 110 may examine various user data 112 to determine that multiple individuals are likely to be co-present. For instance, in some implementations, interactive assistant module 110 may examine one or more calendar entries, e.g., associated with an individual served by interactive assistant module 110 and/or associated other individuals (assuming interactive assistant module has authorization to view those calendar entries), to determine that the individual is scheduled to be at a meeting with other individuals.

In other implementations, interactive assistant module 110 may examine email threads and/or text messages associated with an individual it serves to determine that the individual intends to meet with other individuals at a particular time and place. In some implementations, interactive assistant module 110 may examine social network activity of an individual it serves, e.g., in conjunction with social network activity of other individuals who are related to the served individual (e.g., friends, connections, etc.) to determine that, for instance, the individual is going to a party, or has "checked in" at a particular event and/or venue.

In other implementations, interactive assistant module 110 may examine other signals that may or may not be related to user data 112 to determine co-presence of multiple individuals. For example, interactive assistant module $110_{N+1}$ operating on standalone voice-activated product $106_{N+1}$ may analyze one or more audio signals produced by one or more audio sensors, such as a microphone integral with or in communication with standalone voice-activated product $106_{N+1}$, to determine that multiple individuals are co-present. In some implementations, standalone voice-activated product $106_{N+1}$ may simply detect, based on audio signals, that multiple individuals are co-present, but may not necessarily determine identities of those detected individuals. In some implementations, one or more motion sensors, e.g., integral with one or more client devices 106, may be employed to detect co-presence of multiple individuals.

In some implementations, the one or more signals used to detect co-presence of multiple individuals may include correspondence between a position coordinate of an individual carrying a client device 106 that will be potentially disclosing restricted content and a location known to be likely inhabited by multiple individuals. Suppose an individual carries a client device 106 into a public place such as a restaurant or café. A position coordinate component (not depicted) of the client device 106 may use various technologies, such as a global positioning system ("GPS"), triangulation (e.g., using Wi-Fi or cellular wireless signals), and so forth, to determine that the individual is at a location that is likely going to be inhabited by others. In other implementations, an individual may simply designate a space as "unsafe" or "public," so that whenever a client device 106 detects that it is within that space, interactive assistant module 110 may assume that other, potentially unauthorized individuals are present.

In some implementations, one or more car seat sensors may provide signals that may be used be interactive assistant module 110 to determine co-presence of multiple individuals. Suppose interactive assistant module 110 is operating on a computing device integral with a vehicle (e.g., an onboard navigation system, or a system that controls vehicle media). One or more presence sensors may be employed on the seats of the vehicle that detect when individuals are sitting in those seats. The sensors may, for instance, detect the weight of an individual sitting in a seat, detect that a seatbelt has been fastened, and/or visibly detect presence of a passenger using one or more cameras. Whichever type of sensor is employed, presence signals provided by those sensors may be used by interactive assistant module 110 to determine that there are multiple passengers in the vehicle that may or may not have authorization to perceive restricted content.

In some implementations, interactive assistant module 110 may determine potential co-presence of multiple individuals based on a history of detected co-presence. For instance, suppose a client device 106 detects that at certain times of certain days, multiple individuals are co-present (e.g., at the dinner table, during weekly meetings, etc.). Over time, interactive assistant module 110 may learn these recurring instances of co-presence, so that at those times/places in the future, interactive assistant module 110 may simply assume, unless an individual indicates otherwise, that multiple individuals will be co-present.

In some implementations, standalone voice-activated product $106_{N+1}$ may be configured to detect, in addition to the mere co-presence of others, identities of specific people that are co-present. For example, in some implementations, standalone voice-activated product $106_{N+1}$ may include voice-recognition software that is configured (e.g., via training) to identify specific people based on their voices. For example, if standalone voice-activated product $106_{N+1}$ is deployed in a home or office, it may be trained over time (e.g., using machine learning techniques, neural networks, etc.) to recognize the voices of individuals such as family members, friends, employees, etc.

In other implementations, standalone voice-activated product $106_{N+1}$ may detect one or more wireless signals associated with client devices 106 or simple tags (e.g., ID badges with integral RFID technology) carried by various individuals that are co-present. In some implementations, standalone voice-activated product $106_{N+1}$ may poll a Wi-Fi router to determine which client devices 106 are currently connected, and in some cases may be able to associate those client devices 106 with specific individuals, e.g., using lookup tables, device names, etc. In other implementations, standalone voice-activated product $106_{N+1}$ may detect one or more wireless signals emanating directly from one or more client devices, such as Bluetooth signals, optical signals, etc. In some implementations, the history of co-presence information described above may include information about which specific individuals are typically co-present, so that interactive assistant module can assume that such individuals are co-present at particular times/places in the future.

Figure 5A:
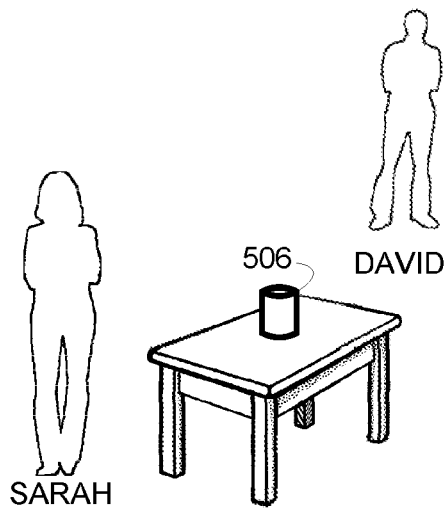
FIG. 5A, FIG. 5B, and FIG. 5C depict another example of disclosed techniques may be practiced in a scenario in which multiple users interact with an interactive assistant module, in accordance with various implementations.
Figure 5B:
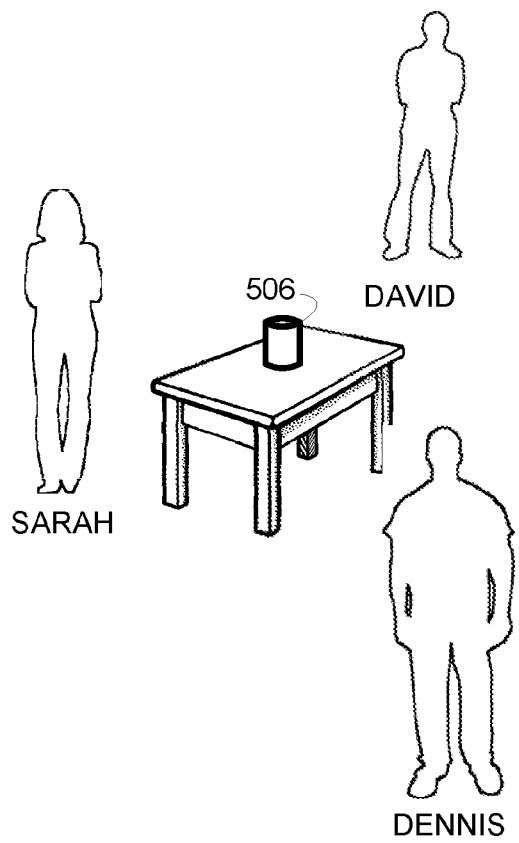
Figure 5C:
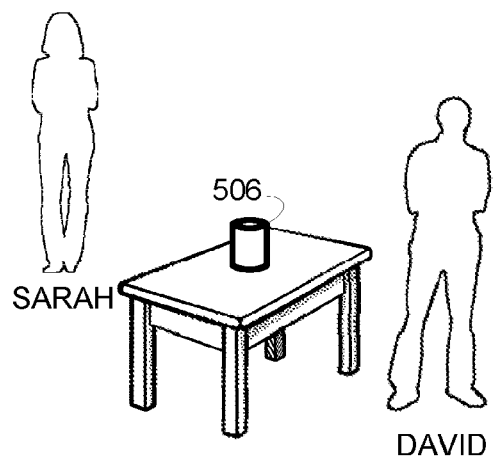

In implementations in which interactive assistant module 110 is able to determine specific identities of co-present individuals, interactive assistant module 110 may be configured to determine whether particular content controlled by a particular individual is authorized for disclosure to those co-present individuals. FIGS. 5A-C depict one such example. In FIG. 5A, Sarah and David are once again co-present with voice-activated product 506. Suppose that while they are co-present, they have a conversation that results in interactive assistant module 110 executing on standalone voice-activated product 506 disclosing (e.g., aloud) various restrict content controlled by one or both individuals. In particular, assume that one or both individuals provides authorization during their conversation for interactive assistant module 110 to disclose specific user data 112. Interactive assistant module may associate David and Sarah into a group, e.g., with a group identifier, that interactive assistant module 110 can use later to determine whether it is authorized to disclose restricted content in the future.

In FIG. 5B, David and Sarah are once again co-present, but this time, Dennis is also co-present. Dennis was not involved in the conversation depicted in FIG. 5A. Consequently, Dennis may not be associated with the group created by interactive assistant module 110 during the conversation of FIG. 5A. However, because Dennis is co-present, any audible output provided by standalone voice-activated product 506 (e.g., by interactive assistant module 110 executing thereon) may be perceived by Dennis. Suppose an individual co-present in FIG. 5B requests or otherwise prompts interactive assistant module 110 operating on standalone voice-activated product 506 to disclose restricted content that was authorized for disclosure during the conversation of FIG. 5A. Interactive assistant module 110 may determine that the individuals present (Sarah, Dennis, David) do not match the group (Sarah, David) previously established in FIG. 5A. Accordingly, interactive assistant module 110 may decline to disclose the restricted content, or at the very least may prompt the individual that controls the restricted content for authorization, prior to disclosing the restricted content in a manner that would be perceived by Dennis.

Suppose that later, Sarah and Dennis are once again co-present with standalone voice-activated product 506, as depicted in FIG. 5C. Dennis is no longer co-present. Interactive assistant module 110 executing on standalone voice-activated product 506 may determine that the same group of individuals that was present during the conversation of FIG. 5A is once again assembled. Based on that determination, should Sarah or Dennis request or otherwise prompt interactive assistant module 110 to provide similar restricted content as was authorized during the conversation of FIG. 5A, interactive assistant module 110 may be free to do so. Of course, if either individual requests or otherwise prompts interactive assistant module 110 to disclose restricted content that was not previously authorized, interactive assistant module 110 may once again decline to disclosure and/or solicit approval.

In the example of FIGS. 5A-C, interactive assistant module 110 engaged in voice-activated dialog with the various individuals to establish groups and group permissions. However, these techniques are equally applicable in other scenarios. For example, suppose a group of users participates in an online chat or text message exchange (i.e. the message exchange thread mentioned above), and that during the exchange of messages, a participant authorizes an interactive assistant module 110 to incorporate various restricted content into the thread. If the same group of users later participates in another message exchange thread (or revisits the same message exchange thread), one or more interactive assistant modules 110 associated with one or more of the participants may determine that the same group identity applies, and therefore may be free to disclose the same or similar restricted content.

In some implementations, a group identifier may span multiple group contexts having completely different output modalities. Suppose that, during a text message exchange thread (e.g., online chat, text message exchange, etc.), an interactive assistant module 110 establishes a group identifier associated with a group of participants, and that certain restricted content is authorized to be disclosed to that group. Suppose that later, the same group of individuals are physically co-present with a different client device, such as standalone voice-activated product $106_{N+1}$. Interactive assistant module $110_{N+1}$ operating on standalone voice-activated product $106_{N+1}$ may determine, based on identities of specific individuals detected as co-present, that the same group is assembled. In some implementations, interactive assistant module $110_{N+1}$ may use the same group identifier to govern which restricted content may be disclosed without first soliciting authorization.

As noted above, restricted content that is controlled by one or more individuals may include a variety of different content. In some implementations, it may include user data 112 that is controlled by an individual, such as their emails, social network profile, contact information, personal documents, calendar, etc. In some implementations, restricted content may include content that may be tailored towards a particular individual. For example, a bilingual individual may prefer that, if alone when interacting with interactive assistant module 110, interactive assistant module 110 speak in Chinese, whereas if the bilingual individual is co-present with others (or participating in a multi-participant message exchange thread), interactive assistant module 110 communicate in English.

Figure 6A:
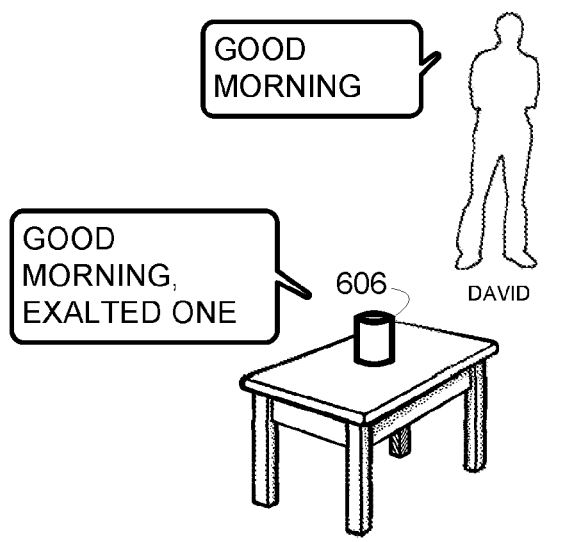
FIGS. 6A and 6B depict yet another example of disclosed techniques may be practiced in a scenario in which multiple users interact with an interactive assistant module, in accordance with various implementations.
Figure 6B:
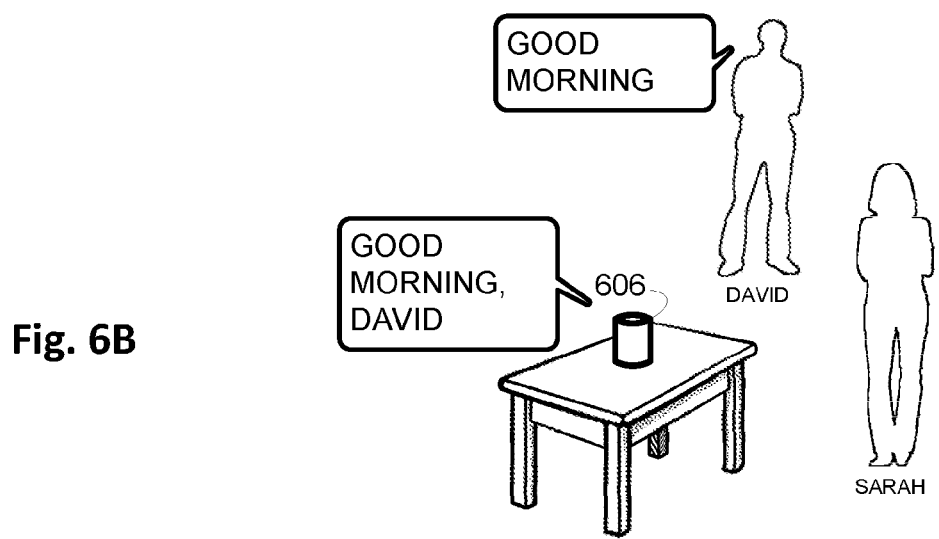

FIGS. 6A and 6B depict another example in which restricted content may be conditionally output depending on whether multiple individuals are co-present. In FIG. 6A, David is alone with his voice-activated product 606. David says, "Good morning," and interactive assistant module 110 executing on voice-activated product 606 responds, "Good morning, your majesty." In FIG. 6B, by contrast, David is joined by Sarah. David may have previously indicated to interactive assistant module 110 that he only wishes to be called "your majesty" when alone. Accordingly, in FIG. 6B, interactive assistant module 110 has detected that David is not alone, and instead responds to David's greeting with "Good morning, David."

FIGS. 6A and 6B demonstrate a concept of the present disclosure in which unrestricted content ("David") is conditionally incorporated into a dialog as a substitute for restricted content ("your majesty") in response to a determination that another individual co-present is not authorized to perceive the restricted content. This concept may be extended to other scenarios. For example, an individual may provide global authorization to phone numbers in his or her contact list, but may not authorize disclosure of other contact information, such as email address, physical address, etc. When an interactive assistant module 110 is requested or otherwise prompted to provide contact information contained in that individual's contact list, interactive assistant module 110 may conditionally disclose only phone information or all contact information depending on whether other individuals would perceive the disclosure. Or, if other individuals might perceive the disclosure, interactive assistant module 110 may only provide work contact information, rather than home contact information. As yet another example, interactive assistant module 110 may conditionally disclose restricted content that may be offensive depending on whether multiple individuals will perceive the disclosure, or on whether particular unauthorized individuals may perceive the disclosure.

Restricted content may be restricted from and/or authorized for disclosure at various levels of granularity. For example, in some instances, a "class" of user data 112 may be authorized and/or restricted. A class of user data 112 may include a user data type, or user data that includes one or more attributes. For example, an individual may authorize/restrict information associated with all contacts in his or her contact list. As another example, a user may authorize/restrict information associated with all text (or email) messages, or text (or email) messages to/from certain users. Additionally or alternatively, an individual may selectively authorize/restrict all calendar entries, or only calendar entries having certain attributes (e.g., weekday appointments may be unclassified, whereas weekend appointments may be restricted). Of course, an individual may authorize or restrict some content items on an individual basis. For example, if an individual is hosting a party, he or she may designate a calendar entry associated with that event as public, or as being authorized to individuals who are invited to the party. Should the individual later participate in a group discussion (in a message exchange thread or vocally in the presence of a voice-activated product), and should other individuals involved in the discussion also be invited to the party, then details of the party that might otherwise be restricted may be disclosed freely. Classes of user data may also be authorized to particular individuals or groups. For example, details of an executive's travel itinerary may be fully available to coworkers, but only partially available to customers and/or clients.

Figure 7:
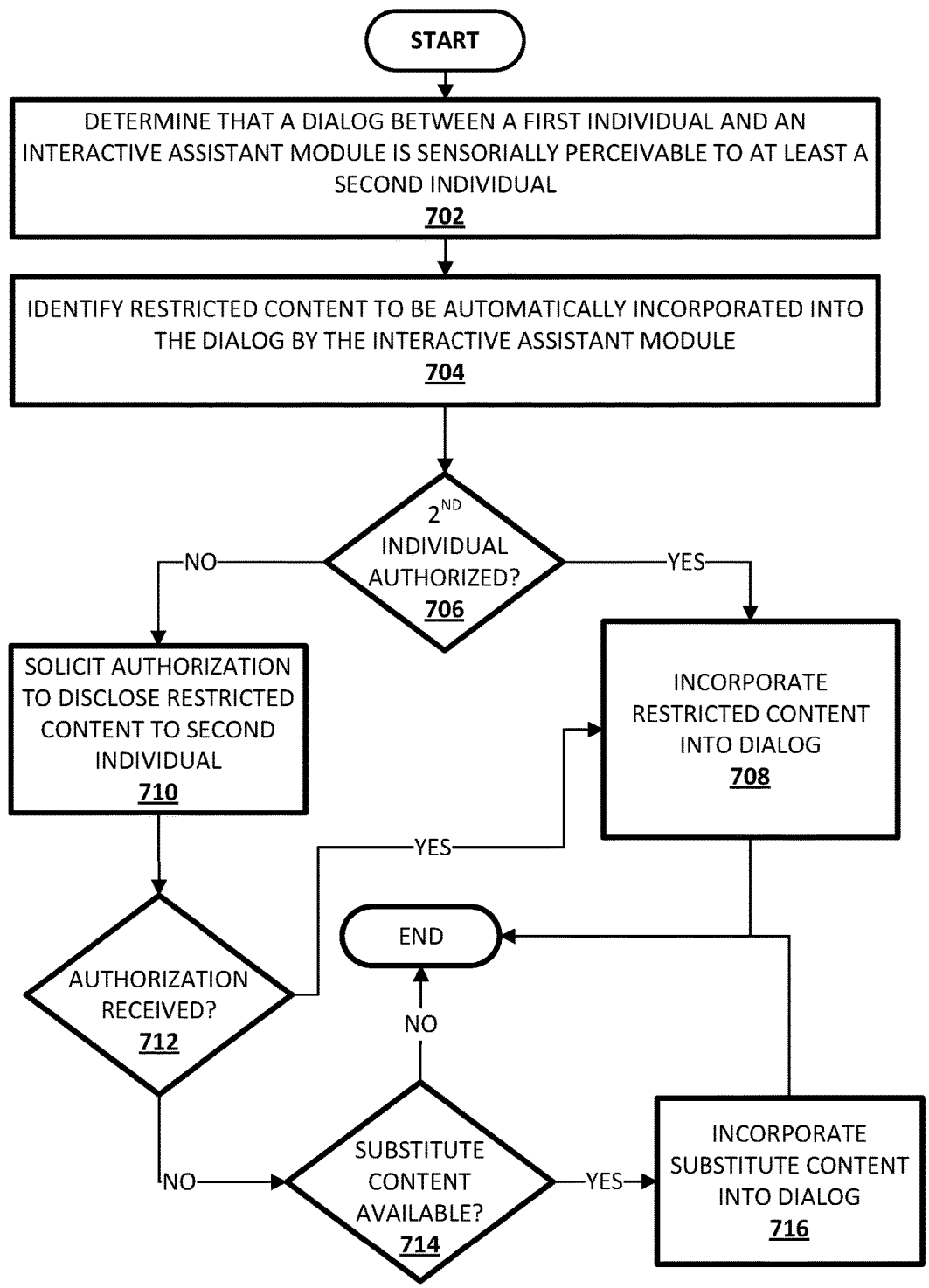
FIG. 7 depicts a flow chart illustrating an example method for interactive assistant modules to safely access and disclose restricted content in group contexts, in accordance with various implementations.

Referring now to FIG. 7, one example method 700 for interactive assistant modules to safely access and disclose restricted content in group contexts is described. For convenience, the operations of the flow chart are described with reference to a system that performs the operations. This system may include various components of various computer systems, including various engines and/or client applications described herein. Moreover, while operations of method 700 are shown in a particular order, this is not meant to be limiting. One or more operations may be reordered, omitted or added.

At block 702, the system may determine that a dialog between a first individual and an interactive assistant module (which may or may not specifically serve the first individual) is sensorially perceivable by at least a second individual. In the context of message exchange threads facilitated with message exchange clients 108, this operation may simply entail identifying multiple participants in the thread. In the context of an interactive assistant module engaging in an audible dialog with the first individual, this operation may include determining, based on one or more of the signals mentioned above, that the first individual is not alone, e.g., because one or more others are co-present.

At block 704, the system may identify restricted content that is to be automatically incorporated into the dialog by the interactive assistant module, e.g., at the explicit request of an individual and/or in response to one or more cues. For example, if an individual requests a photo, the system may determine that the photo has not previously been authorized for disclosure, at least to one or more individuals determined at block 702 to be able to perceive the dialog.

At block 706, the system may determine whether the second individual (or additional individuals, if present) is authorized to perceive the restricted content identified at block 704. If the answer at block 706 is yes, then method 700 may proceed to block 708. At block 708, the system may incorporate the restricted content into the dialog. In the message exchange thread context, the system may incorporate the restricted content into a transcript of a message exchange thread that is viewable by some or all participants in the message exchange thread. In the context of a group of individuals being co-present with a voice-activated product, the system may audibly output the restricted content.

Back at block 706, if the answer is no, then at block 710 the system may provide output to an individual that controls the restricted content soliciting authorization to disclose the restricted content. As noted above, in some implementations, the solicitation may be provided using a different output modality that may not be sensorially perceivable by individuals other than the controlling individual. Additionally or alternatively, the solicitation may be provided using the same modality. In message exchange thread contexts, the solicitation may only appear in the transcript that is visible to the controlling individual, and not in transcripts visible to other participants in the thread.

At block 712, if the controlling individual provides authorization, then method 700 may proceed to block 708, which was described previously. If the answer at block 712 is no, however, then method 700 may proceed to block 714. At block 714, the system may determine whether there is suitable substitute (i.e. unrestricted) content that may be disclosed instead. For example, in the nickname example above, "David" may be substituted for "your majesty." If the answer at block 714 is yes, then at block 716, the substitute unrestricted content may be incorporated into the dialog, similar to block 708. However, if the answer at block 714 is no, then method 700 may end without anything being incorporated into the dialog.

Figure 8:
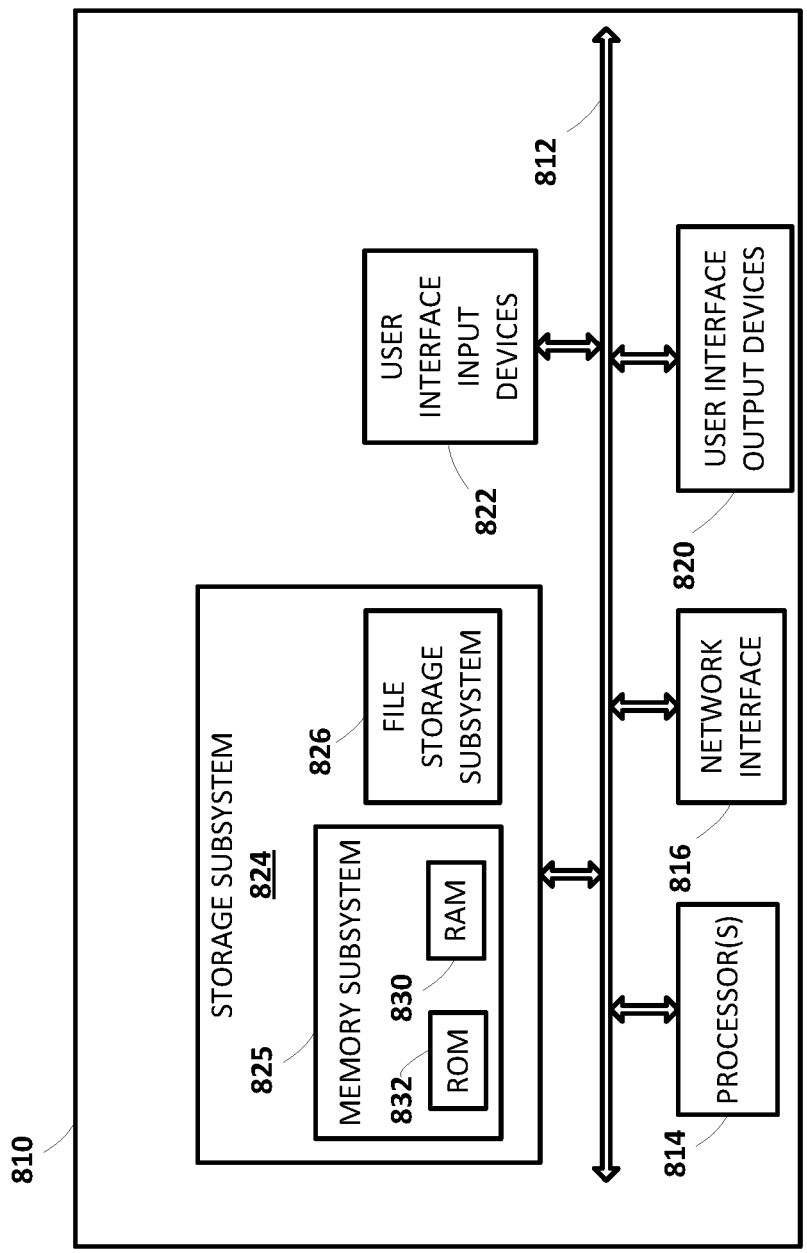
FIG. 8 schematically depicts an example architecture of a computer system.

FIG. 8 is a block diagram of an example computer system 810. Computer system 810 typically includes at least one processor 814 which communicates with a number of peripheral devices via bus subsystem 812. These peripheral devices may include a storage subsystem 826, including, for example, a memory subsystem 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 826 stores programming and data constructs that provide the functionality of some or all of the modules described herein. For example, the storage subsystem 826 may include the logic to perform selected aspects of method 700, and/or to implement one or more components of client device 106 and/or knowledge system 102.

These software modules are generally executed by processor 814 alone or in combination with other processors. Memory 825 used in the storage subsystem 826 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 826, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   determining, by one or more processors, that a spoken natural language dialog between a first individual and an interactive assistant software module is audible to at least a second individual, wherein the determining includes determining, based on one or more signals, that the second individual is co-present with the first individual, and wherein the interactive assistant software module is configured to interpret a semantic meaning of natural language input provided by the first individual as part of the spoken natural language dialog and perform one or more responsive operations;
   identifying, by one or more of the processors, restricted content to be automatically incorporated into the dialog by the interactive assistant software module in response to natural language input provided by the first individual, wherein access to the restricted content is controlled by the first individual;
   conditionally incorporating, by the interactive assistant software module, into the dialog as natural language output of the interactive assistant software module, the restricted content in response to a determination that the second individual is authorized to hear the restricted content; and
   conditionally incorporating, by the interactive assistant software module, into the dialog as natural language output of the interactive assistant software module, an unrestricted content as a substitute for the restricted content in response to a determination that the second individual is not authorized to hear the restricted content.

2. The computer-implemented method of claim 1, further comprising providing, by one or more of the processors, output to the first individual soliciting authorization from the first individual to incorporate the restricted content into the dialog, wherein the output soliciting authorization is provided in response to the determination that the second individual is not authorized to hear the restricted content, and wherein the determination that the second individual is authorized comprises receiving authorization from the first individual to incorporate the restricted content into the dialog.

3. The computer-implemented method of claim 2, wherein the output soliciting authorization is provided to the first individual via an output modality that is not sensorially perceivable by the second individual.

4. The computer-implemented method of claim 1, wherein determining that the dialog is audible to at least the second individual comprises determining that the second individual is a participant in the dialog with the first individual.

5. The computer-implemented method of claim 1, wherein the one or more signals include a calendar entry that indicates co-presence of the first and second individuals.

6. The computer-implemented method of claim 1, wherein the one or more signals include an audio signal produced by an audio sensor.

7. The computer-implemented method of claim 1, wherein the one or more signals include correspondence between a position coordinate of the first individual and a location known to be likely inhabited by multiple individuals.

8. The computer-implemented method of claim 1, wherein the one or more signals include one or more car seat sensors signals.

9. The computer-implemented method of claim 1, wherein the one or more signals include a history of co-presence of the first individual with others.

10. The computer-implemented method of claim 1, wherein the restricted content comprises information that is confidential to the first individual.

11. The computer-implemented method of claim 1, wherein the restricted content comprises a nickname of the first individual and the unrestricted content comprises a name of the first individual.

12. The computer-implemented method of claim 1, wherein the restricted content comprises content deemed potentially offensive to the second individual.

13. The computer-implemented method of claim 1, wherein the determination that the second individual is authorized to hear the restricted content includes a determination that the second individual is authorized to hear a class of restricted content with which the restricted content is associated.

14. The computer-implemented method of claim 1, wherein the determination that the second individual is authorized to hear the restricted content includes a determination that the second individual was previously authorized to hear the restricted content.

15. A system comprising one or more processors and memory operably coupled to the one or more processors, wherein the memory stores instructions that, in response to execution of the instructions by the one or more processors, cause the one or more processors to:
   operate an interactive assistant software module;
   determine, based on one or more signals, that output provided by the interactive assistant software module is audible by a group of two or more individuals by determining, based on one or more of the signals, that the two or more individual are co-present, and wherein the interactive assistant software module is configured to interpret a semantic meaning of natural language input and perform one or more responsive operations;
   identify restricted content to be audibly output by the interactive assistant software module in response to natural language input provided by one of the group of two or more individuals; and
   conditionally output, by the interactive assistant software module as part of the spoken natural language dialog, the restricted content based on a determination that each individual of the group is authorized to perceive the restricted content; and conditionally output, by the interactive assistant software module as part of the spoken natural language dialog, unrestricted content as a substitute for the restricted content based on a determination that one or more individuals of the group are not authorized to perceive the restricted content.

16. The system of claim 15, further comprising instructions to: provide output to an individual that controls disclosure of the restricted content soliciting authorization from the individual to output the restricted content, wherein the output soliciting authorization is provided in response to a determination that another individual of the two or more individuals is not authorized to hear the restricted content, and wherein the determination that the another individual is authorized comprises receiving authorization from the individual to output the restricted content.

17. The system of claim 16, wherein the output soliciting authorization is provided to the individual via an output modality that is not sensorially perceivable by others of the two or more individuals.

18. The system of claim 15, wherein the one or more signals include:
a calendar entry that indicates co-presence of the two or more individuals;
an audio signal produced by an audio sensor;
correspondence between a position coordinate at least one of the two individuals and a location known to be likely inhabited by multiple individuals;
one or more car seat sensors signals; or
a history of co-presence of at least one of the two or more individuals with others.

19. At least one non-transitory computer-readable medium comprising instructions that, in response to execution of the instructions by one or more processors, cause the one or more processors to perform the following operations:

determining that a spoken natural language dialog between a first individual and an interactive assistant software module is audible by at least a second individual, wherein the determining includes determining, based on one or more signals, that the second individual is co-present with the first individual, and wherein the interactive assistant software module is configured to interpret a semantic meaning of natural language input provided by the first individual as part of the spoken natural language dialog and perform one or more responsive operations;

identifying restricted content to be automatically incorporated into the dialog by the interactive assistant software module in response to natural language input provided by the first individual, wherein access to the restricted content is controlled by the first individual;

conditionally incorporating the restricted content into the dialog as natural language output of the interactive assistant software module in response to a determination that the second individual is authorized to perceive the restricted content; and conditionally incorporating, into the dialog as natural language output of the interactive assistant software module, an unrestricted content as a substitute for the restricted content in response to a determination that the second individual is not authorized to hear the restricted content.

\* \* \* \* \*